March 26, 1935.  R. B. RATHBUN  1,995,651
HIGH TEMPERATURE FILTERING
Filed July 29, 1932   2 Sheets-Sheet 1
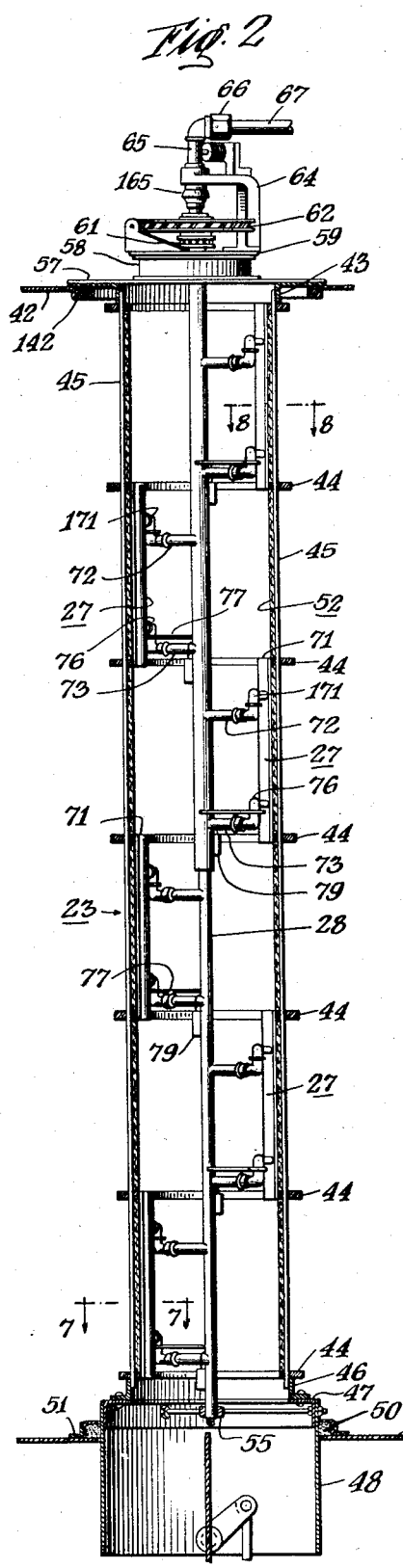
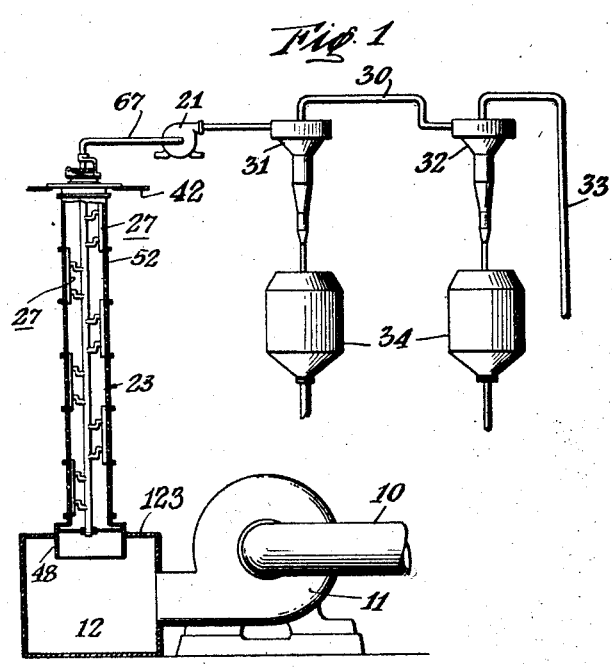
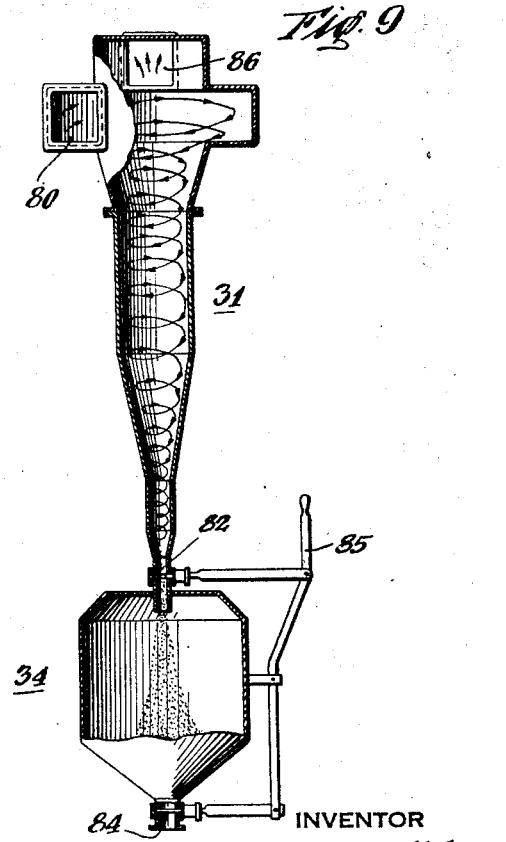
INVENTOR
Ross Buxton Rathbun
BY
Austin & Dix
ATTORNEYS

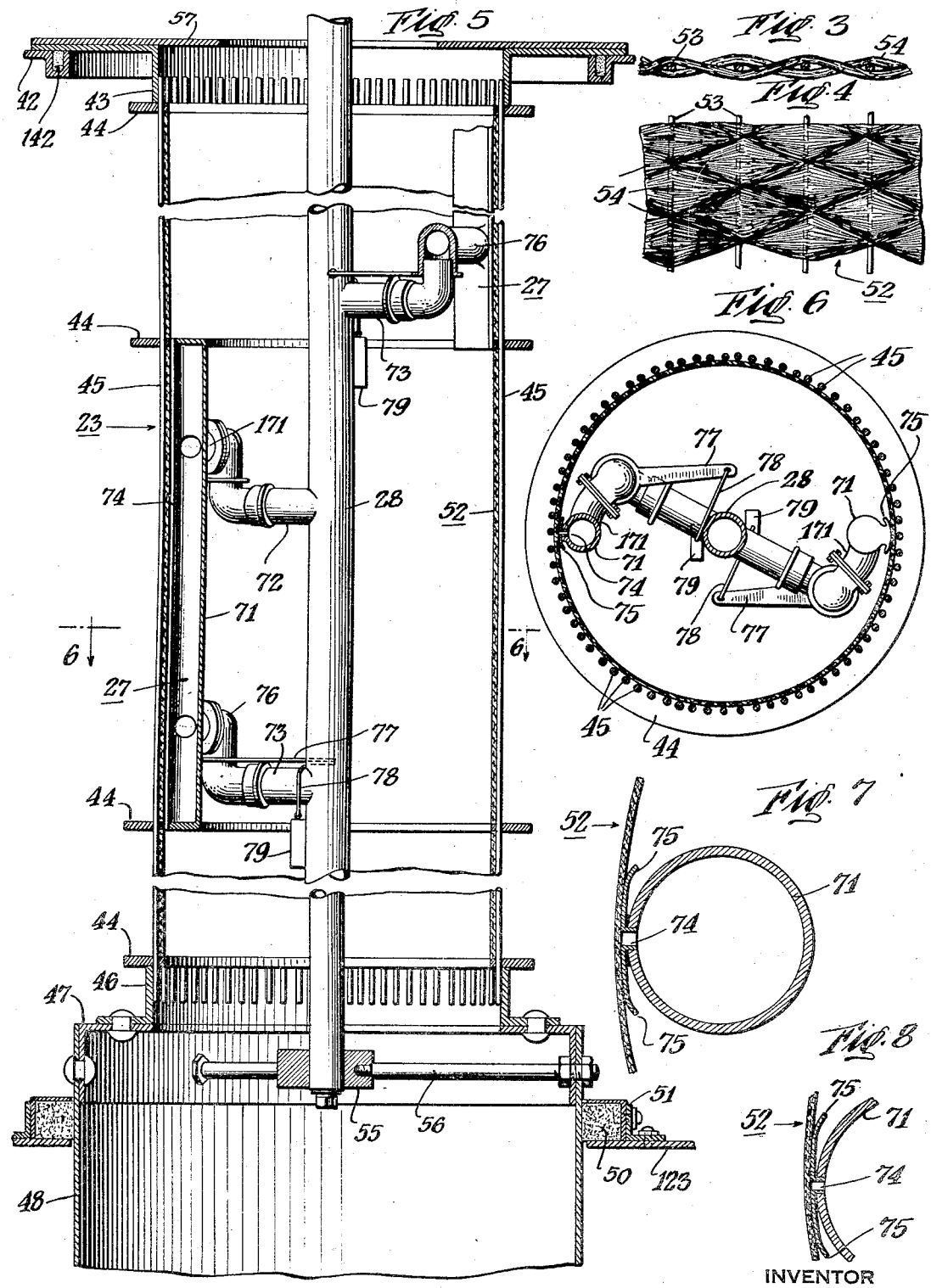

Patented Mar. 26, 1935

1,995,651

UNITED STATES PATENT OFFICE 1,995,651

HIGH TEMPERATURE FILTERING

Ross Buxton Rathbun, El Paso, Tex., assignor to American Smelting & Refining Company, New York, N. Y., a corporation of New Jersey Application July 29, 1932, Serial No. 625,707

4 Claims. (Cl. 183—61)

The invention relates to the separation of solids from fluids in which they are suspended, and more particularly to filtering systems for separating fume from gas, such as are used in the smelting and refining of metals.

According to one form of practicing the invention, the fume containing gas is passed into the interior of a suitable bag filter to deposit the fume on the inside surface of the bag. The bag may comprise a suitable supporting framework for a filter mat. The filter mat may comprise a fabric made up of parallel strands of steel wool interwoven with parallel lengths of wire. This fabric may be passed through suitable rolls to close the interstices and to imbed the wires and to cause the filter mat to present a smooth surface of steel wool fibers.

A suction device comprising a plurality of suction nozzles may be provided for removing the deposited fume, a suitable suction blower being connected to the suction heads and discharging into one or more centrifugal dust collectors connected in series. The suction rate may be arranged according to the most efficient gas speed for the centrifugal separators.

The total nozzle openings may be made to correspond to the allowable cross section of the suction main. In order to keep the suction pressure more or less constant throughout the extent of the suction device, the suction nozzles may be made larger at points further removed from the source of suction.

The invention also consists in certain new and original features of construction and combinations of parts hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part thereof, in which Fig. 1 represents diagrammatically the system according to the invention;

Fig. 2 is a section through one of the filter bags;

Fig. 3 is a cross section through the filter mat;

Fig. 4 is a plan view of the filter mat after it has been compressed;

Fig. 5 is an enlarged section through the bag;

Fig. 6 is a cross section on the line 6—6 of Fig. 5;

Figs. 7 and 8 are sections taken on the lines 7—7 and 8—8 respectively of Fig. 2; and Fig. 9 illustrates one of the centrifugal dust collectors.

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Referring now to the drawings, and more particularly to Fig. 1, the flue or conduit 10 leads the gas carrying the fume from a suitable flue or other point which may receive the material as the product of a metallurgical process. A blower 11 is provided to force the fume and gas into a header 12 which in turn delivers the fume laden gas to the interior of a plurality of bags, one of which is indicated by 23. The filtered gas passes out through the sides of the bag and may be caught and subjected to further treatment or may be wasted, as desired.

The fume is deposited on the inside surface of the bag and is collected by a plurality of rotary suction nozzles 27 which connect with a suction main 67 to which suction pressure is applied by suction blower 21. The discharge from blower 21 is lead to a first cyclone type dust collector which separates out the fume and deposits the same in a suitable receptacle 34. The cleaned gas then passes through pipe 30 to a second dust collector 32 which further cleans the gas, depositing the fume in a second receptacle 34. In fact, the two receptacles may be one and the same receptacle, if desired. The relatively clean remaining gas is lead from the second separator 32 through pipe 33, either back to the suction conduit 10 or to a suitable auxiliary baghouse of small capacity for separating the relatively small amount of remaining fume; or, if desired, the discharge from pipe 33 may be wasted.

Referring now to Figs. 2–8 for a description of one of the filter bags, the bag 23 is supported by the top wall 42 of the baghouse, as indicated particularly in Figs. 1 and 2. The bag is provided with a flanged collar 43 which rests upon the top wall 42 and which cooperates with a seal 142 which may be made up principally of steel wool.

The bag is made up of a plurality of stiff rods 45 suitably welded or otherwise secured to the top ring 43 and passing through holes in a plurality of flat rings 44, as illustrated. The rods 45 are suitably secured to a lower ring 46 at their lower ends.

Since the bag is supported at the top by a gas tight joint, provision is made at the bottom for expansion of the bag. The lower part of the bag has an angular ring 47 connected to the ring 46 and a cylindrical sleeve 48 connected to the ring 47. The sleeve 48 is adapted to slide within a seal 50 of steel wool or other suitable material contained in a holder 51 and mounted upon the partition 123, the top wall of flue 12.

It will be understood that the stiff wire rods 45 and flat rings 44 are sufficiently close together to provide a stiff rigid assembly to support a filter mat 52 in accurate fixed position. For example, the rods may be ⅛ inch in diameter and may be spaced about ½ inch apart. The rings 44 may be spaced about one foot apart. The filter mat is illustrated in Figs. 3 and 4 and may be made as follows:

It may be made up in the form of a cloth or fabric comprising a warp of, for example, #20 copper wire, indicated by 53, and a woof of the strands of steel wool, indicated by 54.

Steel wool in ribbon form is available on the market in strips four inches wide and about ¼ inch thick (unpressed) of any length desired, with the fibers running substantially parallel.

According to the invention these strips are cut or pulled into strips one-half the original width and rolled into strands about ⅜ inch in diameter. These strands form the woof of the fabric, as above described, and may be woven, by hand or otherwise, with the warp wires 53 into a mat. The warp wires may be spaced about ¾ inch apart and stretched between nails driven into a board, if desired, and the woof strands woven over and under in a manner well known in the art of weaving.

When the weaving is finished, the mat may be passed through tinners' rolls several times, which closes all the small interstices and covers the warp wires 53 with a smooth surface of steel wool, the mat then taking the appearance somewhat as indicated in Fig. 4.

This mat is secured to the inside surface of the cylinder made up of the rods 45 by suitable attachment, such as, by fine wire loops at sufficiently close points to properly support the mat. It is better to mount the mat so that the rotary suction nozzles move parallel to the strands of steel wool to prevent roughing up the mat, although satisfactory results have been obtained with the nozzles moving parallel to the warp wires.

As illustrated in Figs. 2 and 5, the central supporting nozzle stem 28 may be made up of sections, the lower end being closed and supported in a suitable bearing 55 which in turn is supported by radial rods extending through the adjacent walls of the bag.

At the top of the bag the stem 28 passes out through a plate 59 having a suitable seal (not shown) for the stem. The plate 59 rests upon a collar 58, which in turn rests upon plate 57 secured to the collar 43.

Keyed to the rotary stem 28 is a worm wheel 62 which rests upon a thrust bearing 61. Driving the worm wheel 62 is a suitable worm (not shown) which in turn is driven by a suitable motor (not shown).

Mounted upon a plate 59 is a bracket 64 which supports a stationary pipe 65 to which is secured a stationary element 165 of a slip joint, the other part of which is secured to the stem 28. The stationary pipe 65 is connected to the suction main 67 by a detachable connection 66.

Secured to the central rotary stem 28 are a plurality of separate suction nozzles 27. Each nozzle 27 is made up of a cylindrical tube 71 having its ends closed and provided with a longitudinal slot 74. Secured to the edges of this slot 74 are a pair of wide ears or flanges 75 to prevent the suction nozzle from digging into the filter mat and to cut down suction leakage at this point.

Each cylindrical tube 71 is supported by an upper branch 171 and a lower branch 76, each of which is swiveled on corresponding branches 72 and 73 respectively. Each lower branch 76 may be provided with a lever 77 to which is connected a flexible strand 78 having a weight 79 and passing over branch 73 in such manner as to yieldably hold the suction nozzle 27 against the wall of the bag.

It will be noted particularly from Fig. 2 that the suction nozzles are oppositely mounted and that each nozzle bears against a pair of flat rings 44 at its ends, these rings operating as tracks for the nozzles to prevent the nozzles from digging into the mat.

Referring now to Fig. 9, centrifugal separators 31 and 32 may be substantially alike in construction, so it is only necessary to describe one in detail. These collectors may have an efficiency as high as 85–90% in average fine material.

The inlet to which the dust and gas is fed from the discharge of blower 21 is indicated by 80 and is tangential to the circular body, as shown. The fume laden gases are given a circular motion and they are caused to travel downwardly through the conical and cylindrical portions of the separator, as shown, to the bottom. This action causes the solids to drop out of the bottom of the separator into the container 34. The cleaned air forms a vortex at the center and passes upward through the outlet 86 into the corresponding inlet 80 of the next separator 32 which operates in the same manner as the separator described above.

A valve arrangement comprising an upper valve 82, a lower valve 84 and operating mechanism 85 may be provided. The arrangement is such that when valve 82 is open, valve 84 is closed. When both separators are arranged to empty into the same container, the same operating mechanism 85 may also operate the upper valve 82 of separator 32, if desired.

It will be understood that for effective cleaning actual contact must be made between the edges or lips of the suction nozzles and the filter mat. No wire or screen must be interposed since in this case air would leak in through the spaces in the mesh of the screen. According to the invention, the wire is actually woven into the internal structure of the mat and is not exposed to the outside surface of the mat. This mat must be kept as thin as possible and the air pulled directly through it by the suction nozzles.

Sufficient pressure must be applied to the nozzle against the surface of the filter mat to effect a seal, but not enough to cause undue wear. It is obvious that this pressure must be kept constant and the weights 79 perform this function very advantageously, being unaffected by differences in temperature.

Furthermore, the surface of the filter mat must be kept absolutely even and free from depressions or else the suction will be destroyed sufficiently to prevent cleaning. The stiff wire framework of the present bag holds the filter mat in such proper position and holds it in a true circle over its entire length and at the same time support is obtained without destroying any of the filtering area of the mat.

The provision of the tracks 44 on which the nozzles ride and the provision of the flanges 75 insure close contact between the nozzles and the filter mat and yet prevent undue wear and digging in.

The total slot area in the suction heads must be kept as low as practical without clogging up, to maintain sufficient suction pressure. By keeping the suction slots as narrow as possible and having only a single filter nozzle at each position, a filter nozzle of maximum effective length is obtained.

In order to maintain a sufficiently even suction pressure throughout the entire extent of the suction head, the suction slots are made narrower at the top (see Fig. 8) where suction is applied than at the bottom of the bag (see Fig. 7). A narrow slot is advantageous to obtain maximum velocity, since it is velocity which does the cleaning.

It is important to have the nozzle speed of cleaning correct. If the speed is too great, the area of poor filtering behind the nozzle is increased. The pores of the mat must clog up to a certain extent for effective cleaning.

It is desirable to have a certain amount of resistance in the filter mat in order to obtain complete cleaning of the main volume of gas to be filtered. It is desired to have at least 8 inches of water suction pressure in the suction nozzles to clean the solids from the mat. 20 inches of water may be taken as the upper suction pressure limit on account of power economy. For continuous cleaning, i. e., vacuum cleaning while the filtering process is going on, 12–20 inches of water suction pressure have been advantageously used. For intermittent cleaning, i. e., vacuum cleaning after the filtering operation has been taking place for a given length of time, it has been found advantageous to use from 8–16 inches of water suction pressure in the suction nozzles. The above suction pressures were used with a differential pressure between the inside and outside of the bag of 4 inches of water.

Furthermore, it is important to arrange the total nozzle area to give the proper gas velocity through the dust collector. There is a lower limit of gas velocity through the dust collector where the latter ceases to function. The practical working limits of the dust collector shown are between 1200 and 3000 feet per minute.

Furthermore, it is important to have the total area of the suction nozzles correspond to the cross section of the suction main. The size of the latter is limited for practical reasons and the number and size of suction nozzles must correspond to the capacity of the suction main.

An advantage of the present invention is that it is possible to operate under temperatures in excess of the temperatures which ordinary fabric of woolen bags can stand and with gases and fumes which have a corrosive action on the old fashioned materials. The present invention operates very well with temperatures above 200° F. Furthermore, due to the absence of the interstices which are present in ordinary cloth bags, a higher filtering rate for a given pressure is obtained.

Tests have shown that where the sulphuric acid content of the dust or fume is sufficient to prevent it from flowing freely, the filter medium quickly plugs up. However, where the dust is quite dry, as in the majority of cases, a very high filtering rate with practically perfect cleaning is obtained.

It is known that Cottrell precipitators may function satisfactorily on certain gases so long as the temperature is sufficiently high for ionization, say, about 700° F. There is a range of approximately 500° F. below this point where the Cottrell process becomes entirely inoperative, and in which the present process functions perfectly. In fact, the present process works satisfactorily at all temperatures from ordinary temperatures to those at which the metal structure fails.

It will be understood that the operation of the suction heads over the filtering medium may be either continuous or intermittent, depending upon operating conditions. If the operation is continuous, the advantages of constant operating conditions are obtained. The head on the gas supply may be arranged at its most efficient volume and likewise the amount of suction applied to the suction heads. Furthermore, the main blower 11 does not have to be stopped while the fume is being removed from the bag and the bags are kept cleaner, resulting in larger handling capacity for the same size bags.

This application is a continuation in part of application Serial No. 546,811, filed June 25, 1931.

While certain novel features of the invention have been disclosed and are pointed out in the annexed claims, it will be understood that various omissions, substitutions and changes may be made by those skilled in the art without departing from the spirit of the invention.

What is claimed is:

1. In a filtering apparatus, a cylindrical bag, a central rotary conduit, a plurality of cleaning heads having slots disposed lengthwise of said bag and adapted to rotate in proximity to the walls of said bag, means for applying a pressure difference to said central conduit, said slots increasing in width with their distance from the point of application of said pressure difference.

2. In an apparatus for removing suspended solid particles from fluids, a filter medium, means for passing said fluids through said medium, suction nozzles for cleaning said medium and passing over the surface thereof, a source of partial vacuum, a suction main connecting said devices to said source, said nozzles having a total orifice area corresponding to the cross section of said main, said nozzles having wider orifices with greater distance from said source.

3. In an apparatus for removing deposited particles from a surface, a suction device having a plurality of elongated restricted orifices adjacent and movable relative to said surface, and a source of partial vacuum to apply suction to said surface through said orifices, said orifices being greater in width the greater the distance from said vacuum source.

4. In filtering apparatus, a filter mat, a nozzle system for cleaning said mat, means for applying a pressure difference to said nozzle system, said nozzle system having slotted means which increases in width with the distance from the point of applying the pressure difference.

ROSS BUXTON RATHBUN.